(12) United States Patent
Diekmeyer et al.

(10) Patent No.: US 8,078,377 B2
(45) Date of Patent: Dec. 13, 2011

(54) COMPRESSED AIR SUPPLY SYSTEM AND METHOD FOR DETERMINING SYSTEM PARAMETERS

(75) Inventors: Heinrich Diekmeyer, Baringshausen (DE); Joachim Reinhardt, Hannover (DE); Andreas Schäl, Nordstemmen (DE); Christoph Wilken, Salzbergen (DE)

(73) Assignee: WABCO GmbH, Hannover (DE)

( * ) Notice: Subject to any disclaimer, the term of this patent is extended or adjusted under 35 U.S.C. 154(b) by 474 days.

(21) Appl. No.: 12/311,635

(22) PCT Filed: Aug. 4, 2007

(86) PCT No.: PCT/EP2007/006906
§ 371 (c)(1),
(2), (4) Date: Apr. 6, 2009

(87) PCT Pub. No.: WO2008/043403
PCT Pub. Date: Apr. 17, 2008

(65) Prior Publication Data
US 2010/0036576 A1    Feb. 11, 2010

(30) Foreign Application Priority Data
Oct. 11, 2006   (DE) .......................... 10 2006 048 071

(51) Int. Cl.
*G06F 19/00* (2006.01)
*B60T 17/02* (2006.01)
(52) U.S. Cl. ......................................... 701/70; 303/9.66
(58) Field of Classification Search ................ 701/1, 70; 303/114.3, 9.66
See application file for complete search history.

(56) References Cited

U.S. PATENT DOCUMENTS

| 5,678,900 | A  | * | 10/1997 | Blanz .......................... 303/6.01 |
| 6,089,831 | A  | * | 7/2000  | Bruehmann et al. .......... 417/282 |
| 6,585,806 | B2 | * | 7/2003  | Quinn et al. .................... 95/121 |
| 6,858,066 | B2 | * | 2/2005  | Quinn et al. .................... 95/121 |
| 7,784,879 | B2 | * | 8/2010  | Koelzer ............................. 303/3 |
| 7,866,760 | B2 | * | 1/2011  | Detlefs et al. ..................... 303/3 |

FOREIGN PATENT DOCUMENTS

| DE | 100 04 091 A1 | 8/2001 |
| EP | 1 529 704 A1  | 5/2005 |
| WO | WO 96/16271   | 5/1996 |
| WO | WO 98/47751   | 10/1998 |

* cited by examiner

*Primary Examiner* — Yonel Beaulieu
(74) *Attorney, Agent, or Firm* — Kramer Levin Naftalis & Frankel LLP

(57) ABSTRACT

A vehicle compressed air supply system includes a supply part with compressor, an air drying part and a consumer part including consumer circuits with brake circuits supplied with compressed air via a multi-circuit safety valve. The brake circuits, and optionally at least one other consumer circuit, include compressed air tanks. Pressure in the circuits is monitored by sensors and evaluated by an electronic control device. To determine system parameters in terms of tank size and compressor output, when filling circuits, the rate of pressure increase in a circuit is determined as a function of compressor speed, and air-drying regeneration is effected. The period of a pre-defined pressure drop or pre-defined pressure gradient is determined and air volume for completing regeneration is calculated from the magnitude of the pressure drop, regeneration time and throttle diameter. Tank volume is determined therefrom. Compressor output is calculated from tank volume and rate of pressure increase.

30 Claims, 3 Drawing Sheets

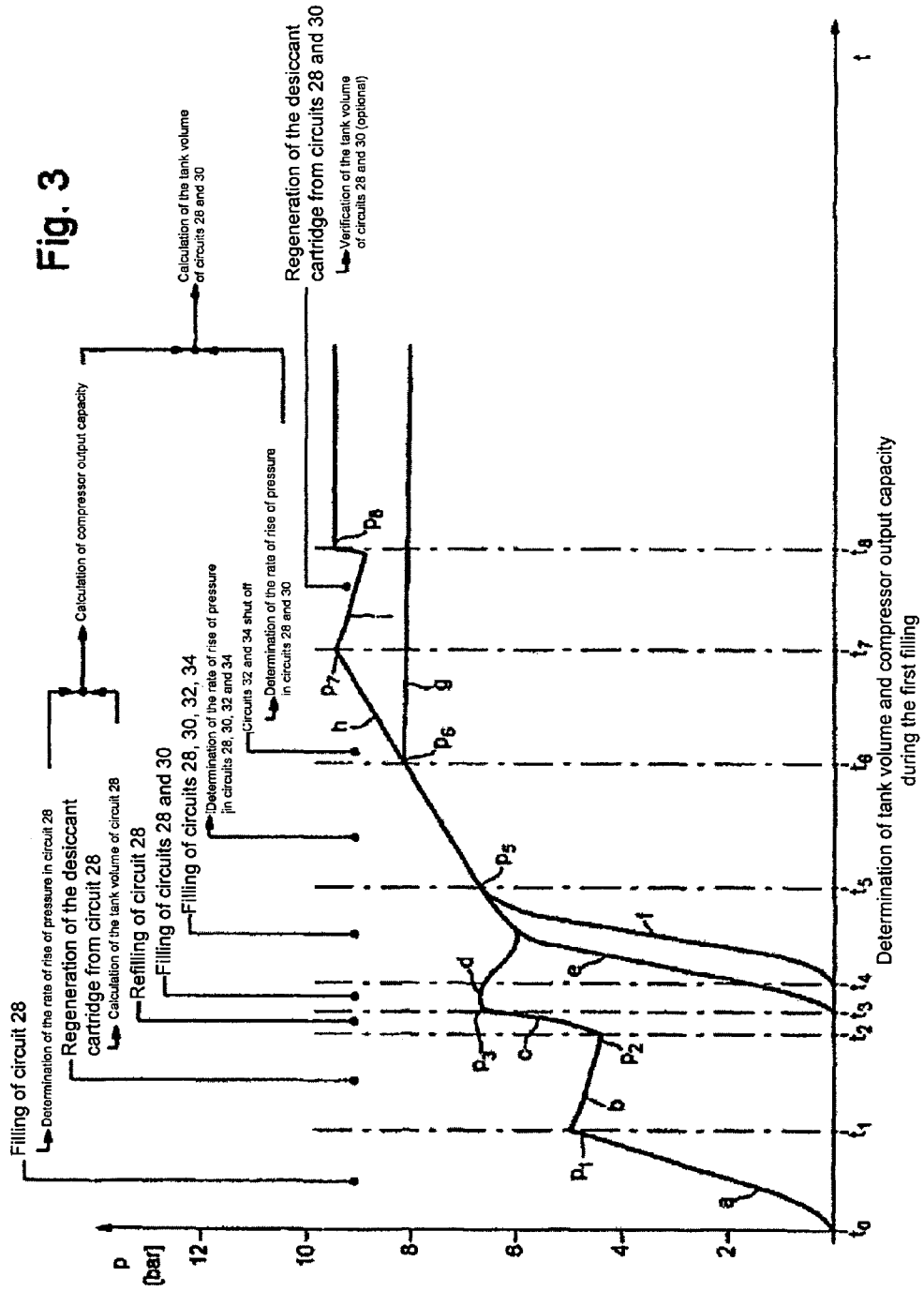

COMPRESSED AIR SUPPLY SYSTEM AND METHOD FOR DETERMINING SYSTEM PARAMETERS

FIELD OF THE INVENTION

The present invention generally relates to a compressed air supply system for motor vehicles and a method for determining the parameters of the system.

BACKGROUND OF THE INVENTION

WO 09847751 A1 describes a pneumatic vehicle brake system, which is provided with a compressor, at least one air-consuming circuit, such as a service brake circuit, a parking brake circuit, a low-pressure auxiliary circuit and a high-pressure circuit, wherein the circuits contain compressed air tanks and demand valves. A first electrically actuatable valve, which is closed in home position, is disposed between the compressor and each consuming circuit. A second electrically actuatable valve, which is open in home position, is disposed between the compressor and the auxiliary circuit. The valves are actuated by an electronic control unit. The output ports of the first valves of the air-consuming circuits are in communication via check valves with the output port of the second normally open valve. Should a pressure demand be present in one of the circuits, for example because of insufficient tank pressure, the corresponding valve is opened by the control unit and, simultaneously, the second valve of the auxiliary circuit is closed. Failure of the compressor leads to a pressure drop, which is recognized by the control unit, which closes the valves or keeps them closed, thus maintaining the pressure in the circuits. A pressure regulating valve determines the pressure level. In the event of failure of the pressure regulating valve, overpressure is discharged via an overpressure valve. Pressure sensors monitor the circuits. The circuits are supplied with air via the second normally open valve and via the check valves connected upstream from the circuits. If the electrical system fails, all valves switch to home position. Nevertheless, the compressor continues to run and to supply the circuits with air via the second normally open valve of the auxiliary circuit, in which case the system pressure is determined by a low-pressure discharge valve of the auxiliary circuit. If a valve fails, the associated circuit can be supplied with air via the valve of the auxiliary circuit and the check valve. The known system is complex, since each consuming circuit is equipped with a compressed air tank.

DE 10004091 C2 describes a compressed air supply device for vehicle compressed air systems having a multi-circuit protective valve, a pressure regulator, a supply line for supplying the circuits of the multi-circuit protective valve with compressed air, and a compressor, which can be switched by means of a pneumatic switching mechanism, a pilot valve being provided to control the pressure regulator and the switching mechanism and a throttle being provided between the pilot valve and the switching mechanism. Each circuit contains a compressed air tank. The pilot valve is controlled and/or regulated by an electronic control and/or regulating unit. Pressure sensors monitor the pressure in the circuits and in the supply line.

The known air supply systems have the disadvantage that either they must be adjusted mechanically by the manufacturer or they must be parameterized by software.

SUMMARY OF THE INVENTION

Generally speaking, it is an object of the present invention to optimize the type of regeneration step described above for an air supply system to the point that the air dryer is universally usable.

The present invention provides embodiments of a multi-circuit protective valve having valves for the individual consuming circuits and an electronic pressure conditioning system having adaptive behavior for determining the pneumatic layout of the vehicle, such as compressor output capacity, tank configuration, etc. The tank size and compressor output capacity are estimated by determining parameters. For this purpose, an adjustment can be made such that over-regeneration of the air dryer cartridge takes place at least in the first regeneration step. The drying behavior of the air dryer is optimized, and, in this way, reduced energy consumption for compressed air generation is achieved. It is no longer necessary to parameterize the air supply system in a manner corresponding to the pneumatic layout of the vehicle. The embodiments of the present invention therefore provide a universal air dryer, which can be installed without adaptation in different vehicles. The valves of the multi-circuit protective valve may be of mechanical or electromagnetic type.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The present invention will be discussed in greater detail hereinafter on the basis of the accompanying drawings, wherein:

FIG. 3 is a graphical representation of the determination of tank volume and compressor output during a first filling of the systems depicted in FIGS. 1 and 2.

DETAILED DESCRIPTION OF THE PREFERRED EMBODIMENTS

Figure 1:
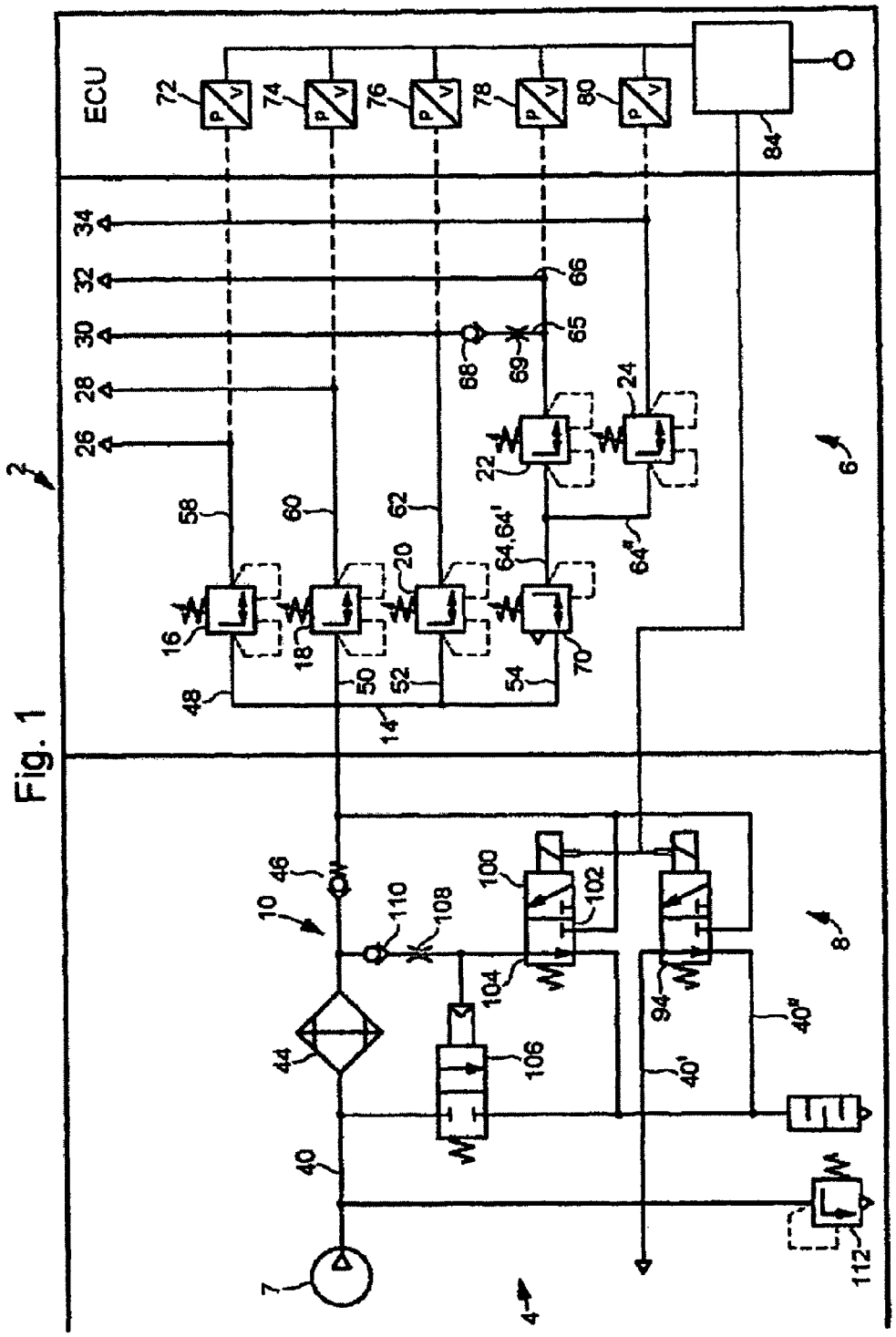
FIG. 1 is a basic circuit diagram of a compressed air supply system having a mechanical multi-circuit protective valve in accordance with an embodiment of the present invention.

Like and corresponding parts in the drawing figures are represented by like reference numerals.

In the drawings, pressurized fluid lines are represented as solid lines and electrical lines are represented as dashed lines.

FIG. 1 of the drawings shows a compressed air supply system 2 having a compressed air supply part 4 and a consuming part 6. Compressed air supply part 4 comprises a compressor 7, a compressor control device 8 and an air dryer part 10.

Consuming part 6 is provided with a compressed air distributor line 14, which branches out to a plurality of valves 16, 18, 20, 22, 24 and to a plurality of consuming circuits 26, 28, 30, 32, 34 supplied with compressed air via the valves.

From compressor 7, a compressed air supply line 40 leads via an air dryer cartridge 44, upstream of which there may be connected a filter (not illustrated), and via a check valve 46 to distributor line 14, from which lines 48, 50, 52, 54 branch off and lead to the valves. From the valves, compressed air lines 58, 60, 62, 64 lead to the consuming circuits. Line 64 branches out to lines 64', 64" leading to circuits 32 and 34.

Line 64' branches off to lines 65, 66 leading to consuming circuits 30, 32. A check valve 68 and a throttle 69 are also disposed in line 65. A pressure limiter 70 is disposed in supply line 54. Valve 24 is disposed in line 64".

Pressure sensors 72, 74, 76, 78, 80 monitor the pressure in the consuming circuits and transmit the respective pressure as a pressure signal to an electronic control unit 84, which controls compressed air supply part 4. The pressure in distributor line 14 may be monitored by a pressure sensor (not illustrated).

In addition to the pressure or instead of the pressure, other variables of state such as air flow, air mass, energy, etc., can also be monitored or determined in the consuming circuits and in the connecting lines.

As an example, consuming circuits 28, 30 may be service brake circuits; consuming circuit 32 may be a trailer brake circuit and/or a parking brake circuit; consuming circuit 34 may be a secondary consuming circuit, such as, for example, driver's cab suspension, door controller, etc. (i.e., nothing that involves the service brake circuits); and consuming circuit 26 may be a high-pressure circuit for an air-suspension system. An air-suspension system normally needs high pressure because the air-suspension bellows have large volume and relatively high pressures.

Service brake circuits 28, 30 are desirably provided with compressed air tanks (not illustrated) in conformity with the 98/12/EU Directives. High-pressure circuit 26 can also have a compressed air tank.

Compressor 7 is controlled mechanically (pneumatically) via compressor controller 8. Compressor controller 8 comprises a solenoid valve 94 (having small nominal width), which can be switched by electronic control unit 84 and which in de-energized home condition, as illustrated, is vented. In this condition, compressor 7 is turned on and at least one consuming circuit is filled with compressed air. When a set pressure threshold is reached, control unit 84 reverses solenoid valve 94 so that compressed air turns off pneumatically actuatable compressor 7 via a line 40'. If solenoid valve 94 is switched to de-energized condition for refilling in response to air consumption, valve 94 is switched back to the home condition illustrated in the drawing and line 40' is vented via a line 40", thus turning on compressor 7. As an alternative to the described exemplary embodiment, a pneumatically switchable valve, which in the unactuated home position is vented, can be connected downstream from solenoid valve 94 to relieve compressor 7 in the actuated condition.

Air dryer part 10 comprises a regeneration solenoid valve 100 (with small nominal width), the input 102 of which is in communication with distributor line 14 and via the output 104 of which there is pneumatically switched a shutoff valve 106, which is in communication with supply line 40 of compressor 7 and serves to relieve the compressor. Regeneration of air dryer cartridge 44 also takes place via regeneration valve 100. Line 40 is then open to atmosphere.

When regeneration solenoid valve 100 is in passing condition, compressor 7 no longer supplies the consuming circuits but, instead, discharges via valve 106. Simultaneously, dry air flows out of consuming circuits 26, 28, 30 via distributor line 14, solenoid valve 100, throttle 108 and check valve 110 through air dryer cartridge 44 for regeneration of its desiccant and continues via valve 106.

Reference numeral 112 denotes an overpressure valve.

Valves 16, 18, 20, 22, 24 are mechanical overflow valves, the opening pressures and closing pressures of which are set to correspond to the respective circuits. The pressure in the circuits is monitored directly at the valves by pressure sensors 72, 74, 76, 78, 80.

Figure 2:
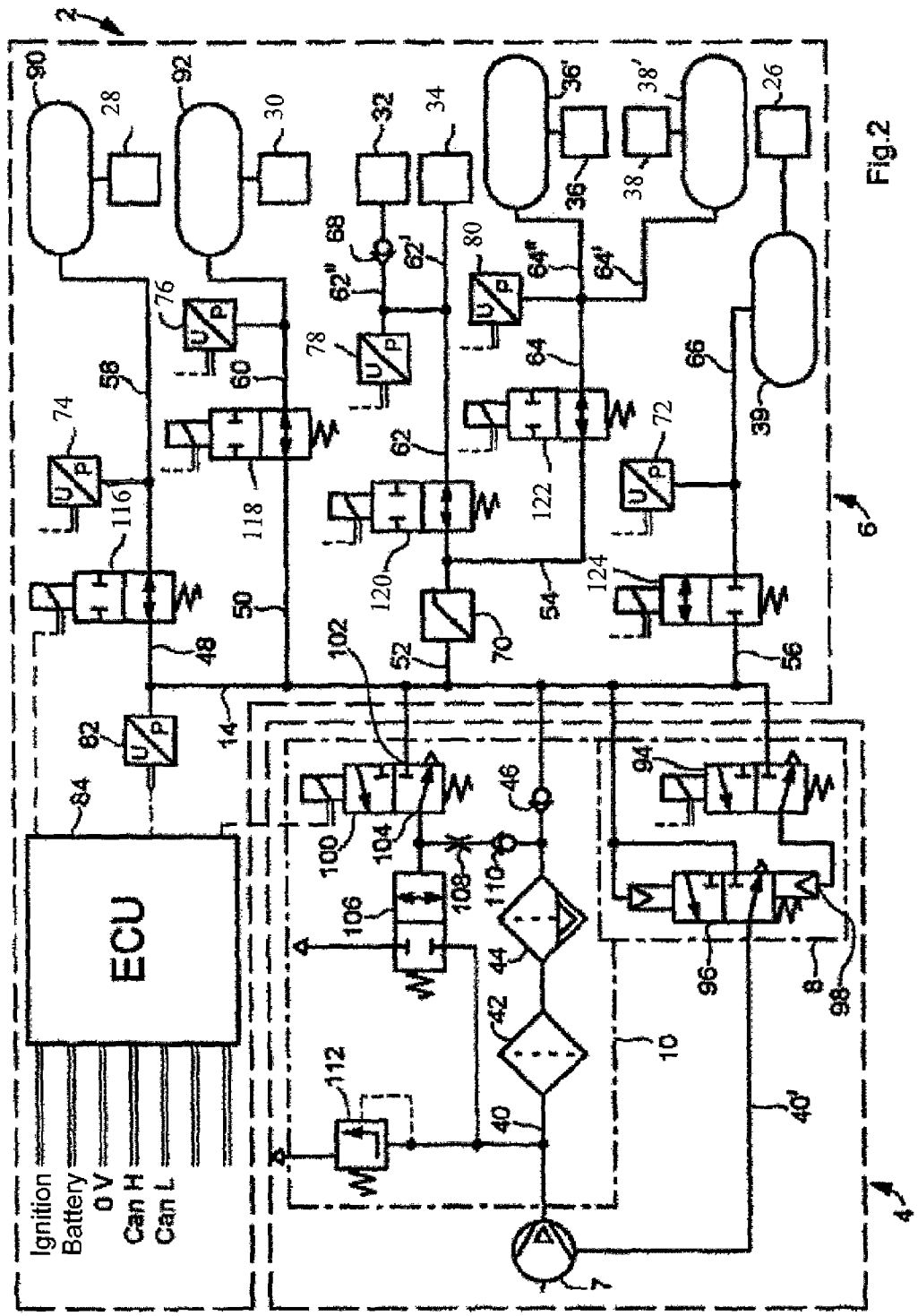
FIG. 2 is a basic circuit diagram of a compressed air supply system having an electromagnetic multi-circuit protective valve in accordance with an embodiment of the present invention.

The embodiment depicted in FIG. 2 shows compressed air supply system 2 having compressed air supply part 4 and consuming part 6. Compressed air supply part 4 comprises compressor 7, compressor control device 8 and air dryer part 10.

Consuming part 6 is provided with compressed air distributor line 14. In contrast to the embodiment of FIG. 1, consuming part 6 includes a plurality of electrically actuatable solenoid valves 116, 118, 120, 122, 124 having restoring springs. The consuming circuits 26, 28, 30, 32, 34, 36, 38 are supplied with compressed air via the solenoid valves.

From compressor 7, compressed air supply line 40 leads via a filter 42, air dryer cartridge 44 and check valve 46 to distributor line 14, from which lines 48, 50, 52, 54, 56 branch off and lead to the solenoid valves. From the solenoid valves, compressed air lines 58, 60, 62, 64, 66 lead to the consuming circuits. Line 62 branches out to lines 62', 62" leading to circuits 32 and 34, and check valve 68 is also disposed in line 62". A pressure limiter 70 is disposed in supply line 52. Line 54 leading to solenoid valve 122 branches off downstream from pressure limiter 70. Line 64 branches out to lines 64', 64" leading to circuits 36 and 38.

Pressure sensors 72, 74, 76, 78, 80 monitor the pressure in the consuming circuits (and, if necessary, in distributor line 14) and transmit the respective pressure as a pressure signal to electronic control unit 84, which controls compressed air supply part 4.

In addition to the pressure or instead of the pressure, other variables of state such as air flow, air mass, energy, etc. can also be monitored or determined in the consuming circuits and in the connecting lines.

As an example, consuming circuits 28, 30 may be service brake circuits; consuming circuit 34 may be a trailer brake circuit, in which case normally two lines lead to the trailer; consuming circuit 32 may be a parking brake circuit having spring actuators; consuming circuits 36 and 38 may be secondary consuming circuits, such as, for example, driver's cab suspension, door controller, etc. (i.e., nothing that involves the service brake circuits); and consuming circuit 26 may be a high-pressure circuit for an air-suspension system.

Service brake circuits 28, 30 are desirably provided with compressed air tanks 90, 92 in conformity with the 98/12/EU Directives. High-pressure circuit 26 contains a compressed air tank 39. Secondary consuming circuits 36, 38 may also contain compressed air tanks 36', 38'.

Compressor 7 is controlled mechanically (pneumatically) via compressor controller 8. Compressor controller 8 comprises solenoid valve 94 (having small nominal width), which can be switched by electronic control unit 84 and which in de-energized home position, as illustrated, is vented, and a valve 96, which can be switched pneumatically via solenoid valve 94 and which, as illustrated, is vented in unactuated home position. If compressor 7 is to be turned on (for example, because a consuming circuit needs compressed air), control unit 84 reverses solenoid valve 94 so that pressure acts on control input 98 of the valve, whereby valve 96 switches back (or is switched) to home condition and turns on the pneumatically actuatable compressor via a line 40'. If solenoid valve 94 is switched to de-energized condition after the circuit has been filled, control input 98 is vented via the solenoid valve, whereby valve 96 switches to its other position and air is admitted to line 40' so that compressor 7 is turned off. As an alternative, valve 96 can be dispensed with, as in the exemplary embodiment according to FIG. 1.

Air dryer part 10 comprises solenoid valve 100 (with small nominal width), the input 102 of which is in communication with distributor line 14 and via the output 104 of which there is pneumatically switched a shutoff valve 106, which is in communication with supply line 40 of compressor 7 and serves to relieve the compressor.

When solenoid valve 100 is in passing condition, compressor 7 no longer supplies the consuming circuits but, instead, discharges via valve 106. Simultaneously, dry air flows out of distributor line 14 (from tanks 90, 92 of the service brake circuits), via solenoid valve 100, throttle 108 and check valve 110 through air dryer cartridge 44 for regeneration of the desiccant and continues via filter 42 and valve 106.

Reference numeral 112 denotes an overpressure valve.

In the compressed air supply system according to embodiments of the present invention, the compressed air tank volume and compressor output capacity are determined during a first filling by determining the rate of rise of the air pressure in the service brake circuit, for example, or the time for filling this circuit, for which purpose the time of the pressure rise in the associated tank is measured in control device 84, as a function of the compressor speed, which depends on the engine speed, from the start of supply until a defined upper pressure value $p_1$ is reached (see curve part a in FIG. 3).

After the upper pre-definable pressure value $p_1$ monitored by pressure sensor 74 is reached, compressor 7 is turned off via valve 94, while solenoid valve 100 of air dryer part 10 is switched to passing condition, so that the compressor discharges no longer into line 40 but, instead, via valve 106. Simultaneously, dry air flows from the tank of circuit 28 filled to $p_1$ via distributor line 14, solenoid valve 100, throttle 108 and check valve 110 through air dryer cartridge 44 for regeneration of the desiccant and continues via valve 106.

Regeneration takes place over a time (see curve part b in FIG. 3) in which adequate regeneration can be achieved, for example until the pressure in the tank has dropped to a pre-definable value $p_2$. Since the throttle orifice diameter is known and is stored in control device 84, the amount of compressed air used for regeneration can be determined from the pressure drop $p_1$-$p_2$, the regeneration time and the orifice diameter. From the amount of compressed air, the orifice diameter and the regeneration time, control device 84 calculates the tank volume of circuit 28. From the rate of pressure rise, determined as a function of compressor speed, or from the measured filling time in circuit 28, as well as the determined compressor speed and the determined volume of circuit 28, control device 84 then calculates the compressor output capacity.

After regeneration of air dryer cartridge 44 by dry air from circuit 28, filling of circuit 28 continues from time $t_2$ (curve part c) until a defined pressure $p_3$ is reached at instant $t^3$. Thereafter, filling of circuit 30 additionally takes place while filling of circuit 28 continues (curve parts d and e), and, from instant $t_4$ on, filling of circuits 32, 34 (curve part f) also takes place so that simultaneous filling of circuits 28, 30, 32, 34 takes place from instant $t_4$ on.

As soon as the same pressure $p_5$ is present in circuits 28, 30, 32 and 34 (see instant $t_5$), the rate of pressure rise in circuits 28, 30, 32 and 34 is determined as a function of compressor speed until instant $t_6$. Thereafter, as soon as pressure $p_6$ is reached at instant $t_6$, circuits 32, 34 are shut off, so that the pressure $p_6$ in circuits 32, 34 remains constant (see straight curve part g). The pressure in circuits 28, 30 is further raised (curve part h) until it reaches a pre-definable pressure $p_7$ (instant $t_7$). The rate of pressure rise as a function of the compressor speed is determined in circuits 28 and 30 from the pressure difference $p_7$-$p_6$ and the time $t_7$-$t_6$. Thereafter, air dryer cartridge 44 is regenerated by dry air from circuits 28 and 30 (curve part i) and then filling of both circuits continues until they are shut off at a pre-defined pressure $p_8$ in these circuits at instant $t_8$.

From the already calculated compressor output capacity and the determined rate of pressure rise in circuits 28 and 30, the tank volume of circuits 28 and 30 can then be calculated in the control device.

The tank volume of circuits 28 and 30 can be verified from the amount of compressed air needed for regeneration, the known orifice diameter and the regeneration time.

The above-described method can be carried out not only for individual tanks or groups of tanks but also for the total volume of all tanks.

The data determined in the above-described manner for compressor capacity and tank volumes are saved in the control device. The saved values are used to monitor the compressor output capacity during driving operation, so that, in the event of declining output capacity, the regeneration process can be adapted to the poorer output capacity and a warning signal can be generated if necessary. Moreover, the inventive method makes it possible to monitor the regeneration orifice for fouling that could reduce the orifice diameter, in turn, making it possible for such fouling to be signaled if necessary.

In case of change or replacement of components of the compressed air supply system, such as the compressor or a tank, etc., the parameters of the compressed air system are re-determined.

Re-determination of the parameters is initiated via a diagnostic unit by programmed or manual action.

Instead of, or in addition to, the air dryer part and its orifice, it is possible to use another pneumatic component having definite and known orifice size for determining the parameters of the compressed air supply system.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A compressed air supply system for a motor vehicle, comprising:
   a compressed air supply part including a compressor;
   an air dryer part including an air dryer cartridge, a throttle and a valve;
   a compressed air consuming part including compressed air consuming circuits including service brake circuits, at least said service brake circuits including compressed air tanks;
   a multi-circuit protective valve operable to supply said compressed air consuming circuits with compressed air;
   sensors operable to monitor pressure in said compressed air consuming circuits; and
   an electronic control device operable to receive and evaluate electrical signals from said sensors, said electronic control device being suitably programmed to adaptively optimize operation of said air dryer part based on compressed air tank volume and compressor output capacity by: determining the rate of increase in air pressure in at least one of said compressed air consuming circuits as a function of compressor speed during filling of said at least one of said compressed air consuming circuits, regenerating said air dryer cartridge from said at least one of said compressed air consuming circuits when said at least one of said compressed air consuming circuits is filled with compressed air, determining one of (i) the time for a pre-defined pressure drop and (ii) the pressure drop over a pre-defined time calculating the amount of air for regeneration from (a) the magnitude of said pressure drop, (b) regeneration time and (c) diameter of said throttle, calculating tank volume of a compressed air tank of said at least one of said compressed air consuming circuits, and calculating said compressor output capacity from said tank volume and at least one of said rate of increase in air pressure and filling time.

2. The compressed air supply system according to claim 1, wherein said filling of said at least one of said compressed air consuming circuits is a first filling of said compressed air supply system.

3. The compressed air supply system according to claim 1, wherein said electronic control device is further suitably programmed to determine said rate of increase in air pressure from a time when said filling of said at least one of said compressed air consuming circuits begins until an upper pre-defined pressure threshold value is reached.

4. The compressed air supply system according to claim 1, wherein said electronic control device is further suitably programmed to effect regeneration of said air dryer cartridge over one of a pre-defined time and until a pre-defined pressure drop.

5. The compressed air supply system according to claim 1, wherein said electronic control device is further suitably programmed to effect a pressure drop until a pre-defined value above a lower pre-defined pressure threshold value for said at least one of said compressed air consuming circuits.

6. The compressed air supply system according to claim 1, wherein said electronic control device is further suitably programmed to monitor said compressor output capacity during driving operation of said vehicle by determining one of time needed to achieve a pre-defined pressurization after consumption of compressed air and pressure increase achieved within a pre-defined time during refilling of said compressed air consuming circuits to achieve a said pre-defined pressurization, pre-defined and calculating said compressor from said rate of increase of air pressure as a function of said compressor speed and from said tank volume.

7. The compressed air supply system according to claim 1, wherein a warning signal is generated when said compressor output capacity falls below a pre-defined value.

8. The compressed air supply system according to claim 1, wherein said electronic control device is further suitably programmed to adapt regeneration of said air dryer cartridge to a changing compressor output capacity.

9. The compressed air supply system according to claim 2, further comprising an air dryer valve, and wherein said electronic control device is further suitably programmed to:
(i) during said first filling of said compressed air supply system, effect filling of a first circuit of said at least one of said compressed air consuming circuits to a first pre-defined pressure value,
(ii) when said first pre-defined pressure value has been reached, effect switching of said air dryer valve to passing condition for regeneration of said air dryer cartridge from said first circuit,
(iii) determine one of pressure drop over a pre-defined regeneration time and regeneration time needed for a pre-defined pressure drop,
(iv) calculate tank volume of a tank of said first circuit from said regeneration time, said pressure drop and said diameter of said throttle, and
(vi) calculate said compressor output capacity from said tank volume and from said rate of pressure increase as a function of compressor speed.

10. The compressed air supply system according to claim 9, wherein, said electronic control device is further suitably programmed to effect (i) continued filling of said first circuit after regeneration of said air dryer cartridge from said first circuit until a second defined pressure is reached, (ii) when said second defined pressure is reached, continued filling of said first circuit and also concurrent filling of a second circuit of said at least one of said compressed air consuming circuits and, (iii) when a pre-defined time is reached, continued filling of said first and second circuits and also concurrent filling of a third circuit of said at least one of said compressed air consuming circuits.

11. The compressed air supply system according to claim 10, wherein said electronic control device is further suitably programmed to (i) determine the rate of pressure increase in said first, second and third until pressure in each of said first, second and third circuits is the same, (ii) when pressure in said first, second and third circuits has reached a pre-defined value, shut off said third circuit and determine rate of pressure increase in said first and second circuits until a pre-defined instant, and (iii) after said pre-defined instant calculate tank volume of said first and second circuits from said rate of pressure increase as a function of compressor speed and said compressor output capacity.

12. The compressed air supply system according to claim 11, wherein said electronic control device is further suitably programmed to verify said tank volume of said first and second circuits from said regeneration time, pressure drop and diameter of said throttle, after regeneration of said air dryer cartridge from said first and second circuits.

13. The compressed air supply system according to claim 1, wherein said electronic control device is further suitably programmed to effect over-regeneration of said air dryer cartridge.

14. The compressed air supply system according to claim 1, wherein said electronic control device is further suitably programmed to re-determine parameters of said compressed air supply system when system components are one of changed and replaced.

15. The compressed air supply system according to claim 14, further comprising a diagnostic unit operable to initiate re-determination of said system parameters by one of programmed and manual action.

16. A method for determining the parameters of a compressed air supply system for a motor vehicle, said compressed air supply system including a compressed air supply part having a compressor, an air dryer part including an air dryer cartridge, an orifice and a valve, a compressed air consuming part having compressed air consuming circuits including service brake circuits, at least said service brake circuits including compressed air tanks, a multi-circuit protective valve operable to supply said compressed air consuming circuits with compressed air, sensors operable to monitor pressure in said compressed air consuming circuits, and electronic control device operable to evaluate electrical signals from said sensors, the method comprising the steps of:
filling said compressed air consuming circuits, determining the rate of increase of air pressure in at least one of said compressed air consuming circuits as a function of compressor speed, when said at least one of said compressed air consuming circuits is filled, regenerating said air dryer cartridge with compressed air from said at least one of said compressed air consuming circuits, determining one of (i) the time of a pre-defined pressure drop and (ii) the pressure drop over a pre-defined time, determining the amount of air for regeneration from the magnitude of said pressure drop, regeneration time and diameter of said orifice, determining tank volume of a compressed air tank of said at least one of said compressed air consuming circuits, calculating output capacity of said compressor from said tank volume and at least one of said rate of increase of air pressure and filling time, and adaptively optimizing operation of said air dryer part based on said compressed air tank volume and said compressor output capacity.

17. The method according to claim 16, wherein said step of filling said compressed air consuming circuits is a first filling of the compressed air supply system.

18. The method according to claim 16, wherein said rate of increase of air pressure is determined from a time when supply begins until an upper pre-defined pressure threshold value associated with said at least one of said compressed air consuming circuits is reached.

19. The method according to claim 16, wherein said step of regenerating said air dryer cartridge is performed over one of a pre-defined time and until a pre-defined pressure drop.

20. The method according to claim 16, further comprising the step of allowing pressure to drop until a pre-defined value above a lower pre-defined pressure threshold value associated with said at least one of said compressed air consuming circuits.

21. The method according to claim 16, further comprising the step of monitoring compressor output capacity during driving operation of said vehicle, said step of monitoring compressor output capacity including the steps of: determining one of (i) time needed to achieve a pre-defined pressurization after consumption of compressed air and (ii) pressure increase achieved within a pre-defined time during refilling of said compressed air consuming circuits to achieve said pre-defined pressurization, after and calculating said compressor output capacity from said rate of increase of air pressure as a function of said compressor speed and from said tank volume.

22. The method according to claim 16, further comprising the step of generating a warning signal when said compressor output capacity falls below a pre-defined value.

23. The method according to claim 16, further comprising the step of adapting regeneration of said air dryer cartridge to a changing compressor output capacity.

24. The method according to claim 17, further comprising the steps of:

during first filling of said compressed air supply system, filling a first circuit of said at least one of said compressed air consuming circuits to a first pre-defined pressure value, when said pre-defined pressure value has been reached, switching an air dryer valve of said air dryer part to passing condition for regenerating said air dryer cartridge from said first circuit, determining one of pressure drop over a pre-defined regeneration time and regeneration time for a pre-defined pressure drop, calculating tank volume of a tank of said first circuit from said regeneration time, said pressure drop, and said diameter of said air dryer orifice, and calculating output capacity of said compressor from said tank volume and said rate of pressure increase as a function of compressor speed.

25. The method according to claim 24, further comprising the steps of: (i) continuing to fill said first circuit after regeneration of said air dryer cartridge from said first circuit until a second defined pressure is reached, (ii) when said second defined pressure is reached, continuing to fill said first circuit and concurrently filling a second circuit of said at least one of said compressed air consuming circuits and, (iii) when a pre-defined time is reached, continuing to fill said first and second circuits and concurrently filling a third circuit and a fourth circuit of said at least one of said compressed air consuming circuits.

26. The method according to claim 23, further comprising the steps of determining the rate of pressure increase in said first, second, third and fourth circuits until pressure in each of said first, second, third and fourth circuits is the same pressure, when pressure in said first, second, third and fourth circuits has risen to a pre-defined value, shutting off said third and fourth circuits, determining rate of pressure increase in said first and second circuits until a pre-defined instant, and after said pre-defined instant, calculating tank volume of said first and second circuits from said rate of pressure increase as a function of compressor speed and said compressor output capacity.

27. The method according to claim 26, further comprising the steps of verifying said tank volume of said first and second circuits from said regeneration time, pressure drop and said diameter of said orifice after regeneration of said air dryer cartridge from said first and second circuits.

28. The method according to claim 16, wherein said air dryer cartridge is over-regenerated during at least said step of regenerating said air dryer cartridge.

29. The method according to claim 16, further comprising the step of re-determining parameters of said compressed air supply system when system components are one of changed and replaced.

30. The method according to claim 29, wherein said re-determining step is initiated by a diagnostic unit via one of programmed and manual action.

* * * * *